US012780738B2

(12) United States Patent
Nojima et al.

(10) Patent No.: US 12,780,738 B2
(45) Date of Patent: Nov. 3, 2026

(54) MnZnCo-BASED FERRITE

(71) Applicant: JFE CHEMICAL CORPORATION, Tokyo (JP)

(72) Inventors: Azumi Nojima, Tokyo (JP); Naoki Soga, Tokyo (JP); Yukiko Nakamura, Tokyo (JP)

(73) Assignee: JFE CHEMICAL CORPORATION, Tokyo (JP)

(*) Notice: Subject to any disclaimer, the term of this patent is extended or adjusted under 35 U.S.C. 154(b) by 27 days.

(21) Appl. No.: 18/565,219

(22) PCT Filed: Jun. 12, 2023

(86) PCT No.: PCT/JP2023/021806

§ 371 (c)(1),
(2) Date: Nov. 29, 2023

(87) PCT Pub. No.: WO2024/024303

PCT Pub. Date: Feb. 1, 2024

(65) Prior Publication Data

US 2025/0145533 A1 May 8, 2025

(30) Foreign Application Priority Data

Jul. 26, 2022 (JP) ................................ 2022-119079
Mar. 16, 2023 (JP) ................................ 2023-042349

(51) Int. Cl.
*C04B 35/26* (2006.01)
*H01F 1/34* (2006.01)

(52) U.S. Cl.
CPC ........... *C04B 35/265* (2013.01); *H01F 1/344* (2013.01); *C04B 2235/3201* (2013.01); *C04B 2235/3208* (2013.01); *C04B 2235/3251* (2013.01); *C04B 2235/3262* (2013.01); *C04B 2235/3274* (2013.01); *C04B 2235/3275* (2013.01); *C04B 2235/3284* (2013.01); *C04B 2235/3418* (2013.01); *C04B 2235/786* (2013.01)

(58) Field of Classification Search
CPC .......... C04B 35/265; C04B 2235/3201; C04B 2235/3208; C04B 2235/3251; C04B 2235/3262; C04B 2235/3274; C04B 2235/3275; C04B 2235/3284; C04B 2235/3418; C04B 2235/786; C04B 2235/72; C04B 2235/782; C04B 2235/94; C04B 35/6261; C04B 35/2658; C04B 35/26; C04B 35/62695; C04B 35/63436; H01F 1/344; H01F 1/03; H01F 1/10; H01F 1/34; H01F 10/20
See application file for complete search history.

(56) References Cited

U.S. PATENT DOCUMENTS

2011/0278491 A1 11/2011 Yoshida et al.

FOREIGN PATENT DOCUMENTS

| | | | | |
|---|---|---|---|---|
| CN | 102325737 | A | 1/2012 | |
| CN | 106278227 | A | 1/2017 | |
| CN | 114190088 | A | 3/2022 | |
| CN | 114206805 | A | 3/2022 | |
| JP | S362283 | B2 | 3/1961 | |
| JP | S6142104 | A | 2/1986 | |
| JP | S6142105 | A | 2/1986 | |
| JP | H01296602 | A | 11/1989 | |
| JP | H0433755 | B2 | 6/1992 | |
| JP | H0536516 | A | 2/1993 | |
| JP | 2000286119 | A | 10/2000 | |
| JP | 2008169072 | A | 7/2008 | |
| JP | 2017145152 | A | 8/2017 | |
| WO | WO-2022014218 | A1 * | 1/2022 | ............ H01F 1/344 |

OTHER PUBLICATIONS

Machine English translation of JP 2000-286119A, Oct. 13, 2000. (Year: 2000).*
Machine English translation of JP 2017-145152A, Aug. 24, 2017. (Year: 2017).*
Machine English translation of WO 2022/014218 A1, Jan. 20, 2022 (Year: 2022).*
Oct. 16, 2025, Office Action issued by the China National Intellectual Property Administration in the corresponding Chinese Patent Application No. 202380012061.7 with English language concise statement of relevance.
Jul. 4, 2025, Office Action issued by the China National Intellectual Property Administration in the corresponding Chinese Patent Application No. 202380012061.7 with English language search report.
Guo Bijun, Magnetic Core Design and Application, Oct. 31, 1989, University of Electronic Science and Technology of China Press.
Mar. 31, 2026, Office Action issued by the China National Intellectual Property Administration in the corresponding Chinese Patent Application No. 202380012061.7 with English language search report.

* cited by examiner

*Primary Examiner* — Alan D Diamond
(74) *Attorney, Agent, or Firm* — KENJA IP LAW PC

(57) ABSTRACT

To provide MnZnCo-based ferrite with small magnetic losses over a wide frequency range and a wide temperature range. Disclosed is MnZnCo-based ferrite containing basic components and auxiliary components, in which the basic components are $Fe_2O_3$: 51.00 mol % or more and less than 58.00 mol %, ZnO: 6.00 mol % or more and less than 13.00 mol %, and CoO: more than 0.10 mol % and 0.50 mol % or less, with the balance being MnO, and the auxiliary components are 50 mass ppm to 500 mass ppm of Si in terms of $SiO_2$, 200 mass ppm to 2000 mass ppm of Ca in terms of CaO, 85 mass ppm to 500 mass ppm of Nb in terms of $Nb_2O_5$, and 5 mass ppm to 20 mass ppm of K, relative to the basic components.

2 Claims, No Drawings

MnZnCo-BASED FERRITE

TECHNICAL FIELD

This disclosure relates to MnZnCo-based ferrite with reduced core loss that is particularly suitable for use in main transformers of direct current-direct current (DC-DC) converters in automobiles.

BACKGROUND

MnZnCo-based ferrite is one of the typical soft magnetic materials and is used in main transformers and noise filters in automotive DC-DC converters. Among them, MnZnCo-based ferrite used for power supplies in main transformers are required to have low loss over a wide temperature range at 100 kHz. In recent years, low loss is required even at high frequencies.

One factor that should be controlled to keep magnetic losses low over a wide temperature range is the magnetic anisotropy constant $K_1$. Magnetic loss takes its minimum value at the temperature where $K_1=0$. The closer the absolute value of $K_1$ is to zero, the smaller the value of magnetic loss. The overall $K_1$ of ferrite is determined by adding up the $K_1$ of each of the elemental ions of the main components of ferrite. $Fe^{2+}$ and $Co^{2+}$ have positive $K_1$, while $Fe^{3+}$ and $Mn^{2+}$ have negative $K_1$. In addition, $Co^{2+}$ can reduce the temperature dependence of $K_1$, and thus the thermal variation of $K_1$. Therefore, when $Co^{2+}$ is present, $K_1$ takes a value closer to 0 over a wider temperature range than when $Co^{2+}$ is absent, thus reducing the magnetic loss over a wider temperature range.

For example, JP H04-033755 B (PTL 1) describes a technology in which the thermal behavior of magnetic loss becomes stable by introducing 0.01 mol % to 0.5 mol % of Co ions into ferrite that is mainly composed of $Fe_2O_3$, MnO, and ZnO, thereby expanding the temperature range in which $K_1=0$.

Magnetic losses are classified into three types: hysteresis loss, eddy current loss, and residual loss. Among these, it is known that eddy current loss can be reduced by improving the specific resistivity of ferrite cores. To improve the specific resistivity of ferrite cores, it is effective to add substances other than the basic components that form high-resistivity phases at grain boundaries.

For example, JP S36-002283 B (PTL 2) describes a technology in which oxides such as calcium oxide and silicon oxide are added in small amounts to MnZn ferrite as auxiliary components and caused to segregate at grain boundaries to increase the grain boundary resistance so that the overall resistivity is increased from about 0.01 Ω·m to 0.05 Ω·m to several Ω·m or more, thereby reducing eddy current losses and thus overall magnetic losses.

Another technique to reduce magnetic losses in MnZnCo-based ferrite is the addition of K. The addition of K enables the segregation of auxiliary components at grain boundaries. This effect can reduce magnetic losses. Furthermore, K has the effect of refining crystal grains. Crystal grain refinement is effective in reducing magnetic losses, especially at high frequencies. Thus, the addition of K can reduce magnetic losses.

JP 2000-286119 A (PTL 3) describes a technology to obtain ferrite with low loss and high saturation magnetic flux density by adding NiO to ferrite mainly composed of $Fe_2O_3$, MnO, and ZnO.

The addition of alkali metals to MnZn-based ferrite for loss reduction has been reported. For example, JP H1-296602 A (PTL 4) describes a technology in which magnetic loss at the frequency of 100 kHz is reduced by adding $K_2O$ of 0.15 wt % or less to MnZn ferrite. In addition, JP H5-36516 A (PTL 5) describes a technology to produce a magnetic core with low magnetic loss and high core strength in the frequency range of 10 kHz to 500 kHz in P-rich MnZn ferrite by the addition of 100 ppm to 2000 ppm of K oxides in terms of K.

Furthermore, JP S61-42104 A (PTL 6) and JP S61-42105 A (PTL 7) describe technologies to improve magnetic permeability of magnetic cores for high-frequency power transformers and reduce magnetic losses by the addition of 0.3 wt % or less of K in terms of $K_2CO_3$.

CITATION LIST

Patent Literature

PTL 1: JP H04-033755 B
PTL 2: JP S36-002283 B
PTL 3: JP 2000-286119 A
PTL 4: JP H1-296602 A
PTL 5: JP H5-36516 A
PTL 6: JP S61-42104 A
PTL 7: JP S61-42105 A

SUMMARY

Technical Problem

However, as shown in FIG. 1 of PTL 1, the ferrite described in PTL 1 has a loss-minimum temperature on the low-temperature side, and in the operating range at high temperatures in recent years, there is a risk of accelerated temperature rise and thermal runaway. In addition, no mention is made of saturation magnetic flux density, which is a characteristic necessary for miniaturization of ferrite cores in recent years.

In the technology described in PTL 2, since Co is not contained, the thermal behavior of magnetic loss is not stable, and it is expected that the magnetic loss will be higher at temperatures away from the temperature at which the magnetic loss takes its lowest value, but no mention is made of such magnetic loss.

In the technology described in PTL 3, the addition of NiO shifts the temperature at which the magnetic loss takes its lowest value to the high temperature side, resulting in a larger magnetic loss at the low temperature side.

The methods of adding alkali metals mentioned in PTLs 4 and 5 do not reduce the magnetic loss as much as required in recent years. In addition, since Co is not added, the thermal behavior is not stable. Therefore, it is difficult to say that these methods meet the characteristics required in recent years.

Also, the techniques described in PTLs 6 and 7 do not contain Co as a main component, and it is difficult to say that a material with sufficiently low magnetic loss can be obtained.

In other words, with conventional technology, it has been difficult to provide MnZnCo-based ferrite that meets the recently demanded values for magnetic loss.

It would thus be helpful to provide MnZnCo-based ferrite with small magnetic losses over a wide frequency range and a wide temperature range. As used herein, a wide frequency range refers to a range of about 100 kHz to 500 kHz.

Solution to Problem

The present disclosure successfully solves the above-mentioned problem by adding K to the raw material so that MnZnCo-based ferrite after sintering contains a predetermined amount of K.

Primary features of the present disclosure are as follows.

[1] MnZnCo-based ferrite consisting of basic components, auxiliary components, and inevitable impurities, wherein the basic components are $Fe_2O_3$:51.00 mol % or more and less than 58.00 mol %, ZnO: 6.00 mol % or more and less than 13.00 mol %, and CoO: more than 0.10 mol % and 0.50 mol % or less, with the balance being MnO, and the auxiliary components are 50 mass ppm to 500 mass ppm of Si in terms of $SiO_2$, 200 mass ppm to 2000 mass ppm of Ca in terms of CaO, 85 mass ppm to 500 mass ppm of Nb in terms of Nb 205, and 5 mass ppm to 20 mass ppm of K, relative to the basic components.

[2] The MnZnCo-based ferrite according to aspect [1], wherein an average grain size is 6.5 μm or more and 9.0 μm or less.

[3] The MnZnCo-based ferrite according to aspect [1] or [2], wherein a percentage of crystal grains having a grain size of 6 μm to 10 μm is 51% or more.

[4] The MnZnCo-based ferrite according to any one of aspects [1] to [3], wherein a lowest magnetic loss value is 360 $kW/m^3$ or less when measured with a highest magnetic flux density being 200 mT and at a frequency of 100 kHz.

[5] The MnZnCo-based ferrite according to any one of aspects [1] to [4], wherein a lowest magnetic loss value is 200 $kW/m^3$ or less when measured with a highest magnetic flux density being 50 mT and at a frequency of 500 kHz.

Advantageous Effect

According to the present disclosure, it is possible to provide MnZnCo-based ferrite with low magnetic loss over a wide frequency range of 100 kHz to 500 kHz and even over a wide temperature range. Furthermore, it is possible to provide MnZnCo-based ferrite with small variation in magnetic loss values.

DETAILED DESCRIPTION

First, the basic components of the MnZnCo-based ferrite according to the present disclosure will be specifically described.

$Fe_2O_3$:51.00 Mol % or More and Less than 58.00 Mol % in the Basic Components If the content of $Fe_2O_3$ is less than 51.00 mol % in mole ratio in the basic components, the sintered density decreases and magnetic loss increases. Therefore, the content of $Fe_2O_3$ should be 51.00 mol % or more. The content of $Fe_2O_3$ is preferably 51.20 mol % or more, more preferably 51.30 mol % or more, and even more preferably 51.40 mol % or more. On the other hand, if the content of $Fe_2O_3$ is 58.00 mol % or more in mole ratio in the basic components, the magnetic loss becomes excessively large. Therefore, the content of $Fe_2O_3$ should be less than 58.00 mol %. The content of $Fe_2O_3$ is preferably 56.00 mol % or less, more preferably 54.00 mol % or less, and even more preferably 53.00 mol % or less.

ZnO: 6.00 Mol % or More and Less than 13.00 Mol % of the Basic Components

In order to obtain a lowest magnetic loss value of 360 $kW/m^3$ or less when measured with a highest magnetic flux density being 200 mT and at a frequency of 100 kHz, and a lowest magnetic loss value of 200 $kW/m^3$ or less when measured with a highest magnetic flux density being 50 mT and at a frequency of 500 kHz, the content of ZnO should be 6.00 mol % or more and less than 13.00 mol % in the basic components. The content of ZnO is preferably 8.00 mol % or more, more preferably 10.00 mol % or more, and even more preferably 10.50 mol % or more. On the other hand, the content of ZnO is preferably 12.50 mol % or less, more preferably 11.90 mol % or less, and even more preferably 11.80 mol % or less.

CoO: More than 0.10 Mol % and 0.50 Mol % or Less in the Basic Components

CoO acts to modulate the thermal behavior of magnetic loss, as mentioned above. However, an excess of CoO will lower the temperature at which the magnetic loss takes its lowest value, making it impossible to lower the lowest magnetic loss value. Therefore, the content of CoO is 0.50 mol % or less in the basic components. The content of CoO is preferably 0.49 mol % or less, more preferably 0.48 mol % or less, and even more preferably 0.47 mol % or less. On the other hand, if the content of CoO is low, the improvement in temperature coefficient becomes less significant and the magnetic loss value cannot be improved. Therefore, the content of CoO is more than 0.10 mol % in the basic components. The content of CoO is preferably 0.20 mol % or more, more preferably 0.30 mol % or more, and even more preferably 0.35 mol % or more.

The present disclosure is directed to the MnZnCo-based ferrite, in which the remainder of the basic components other than the above-described $Fe_2O_3$, ZnO, and CoO is manganese oxides. In other words, the total amount of such basic components is 100.00 mol %. When all manganese oxides are converted as MnO, the content of MnO is preferably 30.00 mol % or more and 38.00 mol % or less in the basic components. The content of MnO is more preferably 31.00 mol % or more, more preferably 33.00 mol % or more, and most preferably 35.10 mol % or more. On the other hand, the content of MnO is more preferably 37.50 mol % or less, more preferably 37.00 mol % or less, and most preferably 36.50 mol % or less.

The MnZnCo-based ferrite disclosed herein contains $SiO_2$, CaO, and $Nb_2O_5$ as auxiliary components in addition to the above basic components.

Si: 50 Mass Ppm to 500 Mass Ppm in Terms of $SiO_2$ Relative to the Basic Components $SiO_2$ segregates at the grain boundaries together with CaO to form a highly resistive phase, which has the effect of reducing eddy current loss and overall magnetic loss. If the content of Si is less than 50 mass ppm in terms of $SiO_2$, the effect of Si addition is not sufficient. On the other hand, if the content of Si exceeds 500 mass ppm in terms of $SiO_2$, crystal grains grow abnormally during sintering, which in turn significantly increases magnetic loss. Therefore, the content of Si should be in the range of 50 mass ppm to 500 mass ppm in terms of $SiO_2$ relative to the basic components. Furthermore, to more reliably suppress abnormal grain growth, the content of Si, in terms of $SiO_2$, is preferably 70 mass ppm or more, more preferably 80 mass ppm or more, and even more preferably 90 mass ppm or more. To more reliably suppress abnormal grain growth, the content of Si, in terms of $SiO_2$, is preferably 480 mass ppm or less, more preferably 450 mass ppm or less, and even more preferably 420 mass ppm or less.

Ca: 200 Mass Ppm to 2000 Mass Ppm in Terms of CaO Relative to the Basic Components CaO, when coexisting with $SiO_2$, contributes to the reduction of magnetic loss by segregating at grain boundaries and increasing resistance. However, if the content of Ca is less than 200 mass ppm in terms of CaO, the effect of Ca addition is not sufficient. On the other hand, if the content of Ca is more than 2000 mass ppm in terms of CaO, magnetic loss increases. Therefore, the content of Ca should be in the range of 200 mass ppm to 2000 mass ppm in terms of CaO relative to the basic components. Furthermore, to more reliably suppress abnormal grain growth, the content of Ca, in terms of CaO, is preferably 300 mass ppm or more, and more preferably 500 mass ppm or more. Furthermore, to more reliably suppress abnormal grain growth, the content of Ca, in terms of CaO, is preferably 1800 mass ppm or less, and more preferably 1500 mass ppm or less.

Nb: 85 Mass Ppm to 500 Mass Ppm in Terms of $Nb_2O_5$ Relative to the Basic Components $Nb_2O_5$ effectively contributes to the increase in specific resistivity in coexistence with $SiO_2$ and CaO. If the content of Nb is less than 85 mass ppm in terms of $Nb_2O_5$, the effect is not sufficient. On the other hand, if the content of Nb exceeds 500 mass ppm in terms of $Nb_2O_5$, the magnetic loss increases. Therefore, the content of Nb should be in the range of 85 mass ppm to 500 mass ppm in terms of $Nb_2O_5$ relative to the basic components. The content of Nb, in terms of $Nb_2O_5$, is preferably 90 mass ppm or more, and more preferably 95 mass ppm or more. The content of Nb is preferably 400 mass ppm or less in terms of $Nb_2O_5$, and more preferably 350 mass ppm or less.

Furthermore, it is important that the MnZnCo-based ferrite contain K in an amount ranging from 5 mass ppm to 20 mass ppm as additional auxiliary components in addition to the above-described basic components and auxiliary components. K has the effect of segregating additives at grain boundaries, and acts to increase the specific resistivity. K also has the effect of refining and homogenizing the size of crystal grains, and acts to reduce magnetic loss at high frequencies through the refinement and improve magnetic properties through the homogenization. The actual amount of K to be added to the raw material varies depending on the firing conditions and environment because the amount of K volatilized varies depending on the firing conditions and environment.

Here, if the content of K in the MnZnCo-based ferrite is less than 5 mass ppm, the effect of K addition is not sufficient. Therefore, the content of K in the MnZnCo-based ferrite is 5 mass ppm or more, preferably 6 mass ppm or more. On the other hand, when the content of K in the MnZnCo-based ferrite exceeds 20 mass ppm, the magnetic loss begins to increase because the grain size becomes smaller than the optimum size for magnetic loss at a frequency of 100 kHz. Furthermore, excessive addition of K results in regions where crystal grains are excessively refined and abnormally grow during sintering, which significantly increases magnetic loss. Therefore, the content of K in the MnZnCo-based ferrite is 20 mass ppm or less, preferably 18 mass ppm or less.

The MnZnCo-based ferrite consists of the basic components, auxiliary components, and inevitable impurities as described above. In the present disclosure, the inevitable impurities include Cl, Sr, Ba, etc., which are contained in the raw materials of the basic components. An acceptable total content of the inevitable impurities is about 0.01 mass % or less relative to the entire MnZnCo-based ferrite.

Next, the method of producing the MnZnCo-based ferrite according to the present disclosure will be described. Raw material powder of the basic components that have been weighed so that the compositional ratio of $Fe_2O_3$, MnO, ZnO, and CoO, which are the basic components in the MnZnCo-based ferrite after subjection to sintering, is within the specified range of the present disclosure, is thoroughly mixed and then calcined. To this powder after subjection to the calcination, $SiO_2$, CaO, $Nb_2O_5$, and K, which are the auxiliary components, are weighed and added so that their contents in the sintered MnZnCo-based ferrite are within the specified range of the disclosure, and then thoroughly mixed and ground. The powder thus mixed and ground is granulated with a binder and compacted with a press mold. The formed body thus compacted is fired to make sintered ferrite body (product).

In this way, the sintered ferrite body provides the MnZnCo-based ferrite according to the present disclosure that has a lowest magnetic loss value of 360 $kW/m^3$ or less when measured at a highest magnetic flux density being 200 mT and at a frequency of 100 kHz, and a lowest magnetic loss value of 200 $kW/m^3$ or less when measured with a highest magnetic flux density being 50 mT and at a frequency of 500 kHz, which have been extremely difficult to achieve with conventional MnZnCo-based ferrites.

Furthermore, the sintered ferrite body has a magnetic loss value of 400 $kW/m^3$ or less at 40° C. and 500 $kW/m^3$ or less at 120° C. when measured with a highest magnetic flux density being 200 mT and at a frequency of 100 kHz, and a magnetic loss value of 200 $kW/m^3$ or less at 40° C. and 300 $kW/m^3$ or less at 120° C. when measured with a highest magnetic flux density being 50 mT and at a frequency of 500 kHz.

If the lowest magnetic loss value is 360 $kW/m^3$ or less, the magnetic loss value at 40° C. is 400 $kW/m^3$ or less, and the magnetic loss value at 120° C. is 500 $kW/m^3$ or less when measured with a highest magnetic flux density being 200 mT and at a frequency of 100 kHz, and if the lowest magnetic loss value is 200 $kW/m^3$ or less, the magnetic loss value at 40° C. is 200 $kW/m^3$ or less, and the magnetic loss value at 120° C. is 300 $kW/m^3$ or less when measured with a highest magnetic flux density being 50 mT and at a frequency of 500 kHz, loss is low over a wide frequency range, making it possible to handle a variety of frequencies.

As used herein, the lowest magnetic loss value means the magnetic loss value (iron loss value) at the temperature at which the magnetic loss value (iron loss value) takes its minimum value (magnetic-loss-minimum temperature).

Average Grain Size: 6.5 μm or More and 9.0 μm or Less

The MnZnCo-based ferrite according to the present disclosure preferably has an average grain size of 6.5 μm or more and 9.0 μm or less. If the average grain size is less than 6.5 μm, the magnetic loss measured with a highest magnetic flux density being 200 mT and at a frequency of 100 kHz may worsen. On the other hand, if the average grain size exceeds 9.0 μm, the magnetic loss measured with a highest magnetic flux density being 50 mT and at a frequency of 500 kHz may worsen.

Proportion of Crystal Grains Having a Grain Size of 6 μm to 10 μm: 51% or More

From the viewpoint of achieving low magnetic loss over a wide frequency range and a wide temperature range, in the MnZnCo-based ferrite disclosed herein, a percentage of crystal grains having a grain size of 6 μm to 10 μm that are present in the MnZnCo-based ferrite is preferably 51% or more.

If the average grain size of MnZnCo-based ferrite is 6.5 μm or more and 9.0 μm or less and the percentage of crystal grains having a grain size of 6 μm to 10 μm is 51% or more, the size of crystal grains can be adjusted such that both the magnetic loss measured with a highest magnetic flux density being 200 mT and at a frequency of 100 kHz and the magnetic loss measured with a highest magnetic flux density being 50 mT and at a frequency of 500 kHz are low, and the size uniformity of the crystal grains thus obtained reduces residual loss. As a result, the magnetic loss properties according to the present disclosure can be achieved.

Other methods of producing the sintered body (MnZnCo-based ferrite) not mentioned above are not limited in terms of conditions or equipment used, for example, and so-called conventional methods may be followed.

EXAMPLES

Next, examples of the present disclosure will be described.

Example 1

First, $Fe_2O_3$, ZnO, MnO, and CoO, as basic components, were weighed in powder form to obtain the compositional ratio (mol %) presented in Table 1, and the raw material powder thus weighed was mixed for 16 hours using a wet ball mill, and then calcined for 3 hours at 925° C. in air to obtain calcined powder. $SiO_2$, CaO, $Nb_2O_5$, and K ($K_2CO_3$ in this example) were added as auxiliary components to the calcined powder in the ratio (mass ppm) presented in Table 1, ground for 16 hours using a wet ball mill, and then dried to obtain ground powder. To the ground powder, polyvinyl chloride was added as a binder and granulated through a sieve to obtain granulated powder. The granulated powder was formed into a ring shape with an outer diameter of 36 mm, an inner diameter of 24 mm, and a height of 12 mm, then subjected to firing for 2 hours in mixed gas of nitrogen and air with oxygen partial pressure controlled in the range of 1 vol % to 5 vol % to obtain a ring-shaped sample (sintered ferrite body). The maximum temperature of the atmosphere during the firing was set in the range of 1300° C. to 1350° C. Such firing was performed in a lab-scale batch furnace.

The ring-shaped sample was subjected to 5 primary and 5 secondary windings, and the magnetic loss (iron loss) was measured with an alternating-current (AC) BH loop tracer when the sample was excited to a magnetic flux density of 200 mT at 100 kHz and to a magnetic flux density of 50 mT at 500 kHz, at temperatures of 23° C. to 130° C. The temperature at the time of measurement of magnetic properties, etc., means the value measured by a thermocouple on the surface of the sintered ferrite body to be measured. More specifically, the ambient temperature of the measurement environment was set to a predetermined temperature, and magnetic and other properties were measured after confirming that the surface temperature of the sintered ferrite body was the same as the ambient temperature.

The average grain size and the percentage of crystal grains having a grain size of 6 μm to 10 μm were measured as follows. That is, the prepared ring-shaped sample was fractured, and the cross section after the fracture was observed under an optical microscopy (at 400× magnification, the number of crystal grains in this field of view was 1000 to 2000). The crystal grain size was calculated assuming each crystal grain to be a perfect circle, and the average value was obtained. For such calculations, an image interpretation software, "A-ZO KUN"® (A-ZO KUN is a registered trademark in Japan, other countries, or both of Asahi Kasei Engineering Co., Ltd.), was used. Next, the particle size distribution of crystal grains was calculated to determine the percentage of crystal grains (percentage of number of grains) having a grain size of 6 μm to 10 μm.

Based on the results of the above measurements, the magnetic-loss-minimum temperature, the lowest magnetic loss value, and the magnetic loss values at 40° C. and 120° C. when measured with a highest magnetic flux density being 200 mT and at a frequency of 100 kHz, the magnetic-loss-minimum temperature, the lowest magnetic loss value, and the magnetic loss values at 40° C. and 120° C. when measured with a highest magnetic flux density being 50 mT and at a frequency of 500 kHz, the average grain size, and the percentage of crystal grains having a grain size of 6 μm to 10 μm are listed in Table 1. Here, Nos. 1-15 in Table 1 are our examples conforming to the present disclosure, while Nos. 16-21 in Table 1 are comparative examples where the content of K of the sintered body is outside the range of the present disclosure, and Nos. 22-39 in Table 1 are comparative examples where the content of basic components or auxiliary components other than K is outside the range of the present disclosure. In both our examples and comparative examples in Table 1, the total content of inevitable impurities is 0.01 mass % or less.

As can be seen in Table 1, the MnZnCo-based ferrite of our examples, in which the compositions of the basic components, $Fe_2O_3$, ZnO, MnO, and CoO, and of the auxiliary components, $SiO_2$. CaO, and $Nb_2O_5$, were appropriately selected and an appropriate amount of K was contained, has a lowest magnetic loss value of 360 kW/$m^3$ or lower when measured with a highest magnetic flux density being 200 mT and at a frequency of 100 kHz, and a lowest magnetic loss value of 200 kW/$m^3$ or lower when measured with a highest magnetic flux density being 50 mT and at a frequency of 500 kHz, indicating low loss over a wide frequency range and a wide temperature range.

These properties, where the average grain size is in an appropriate range of 6.5 μm to 9.0 μm, or where the percentage of crystal grains having a grain size of 6 μm to 10 μm is 51% or more, are the result of the effect of inclusion of K, providing more uniform crystal grains.

These results indicate that, according to the present disclosure, the addition of K can produce low-loss MnZnCo-based ferrite in a wide frequency range from 100 kHz to 500 kHz and in a wide temperature range.

In contrast, in those cases where at least one of the basic components, $Fe_2O_3$, ZnO, MnO, and CoO, or the auxiliary components, $SiO_2$, CaO, $Nb_2O_5$, and K, was outside the scope of the present disclosure, at least one of the following two conditions was not achieved: a lowest magnetic loss value of 360 kW/$m^3$ or lower when measured with a highest magnetic flux density being 200 mT and at a frequency of 100 kHz, or a lowest magnetic loss value of 200 kW/$m^3$ or lower when measured with a highest magnetic flux density being 50 mT and at a frequency of 500 kHz.

TABLE 1

| | Chemical composition | | | | | | | | Magnetic property | | | |
|---|---|---|---|---|---|---|---|---|---|---|---|---|
| | | | | | Auxiliary component (mass ppm) | | | | 100 kHz-200 mT | | | |
| | Basic component (mol %) | | | | | | | K (*content of sintered body) | Magnetic-loss-minimum temp. (° C.) | Lowest magnetization loss value (kW/m³) | Magnetic loss value at 40° C. (kW/m³) | Magnetic loss value at 120° C. (kW/m³) |
| No. | $Fe_2O_3$ | MnO | ZnO | CoO | $SiO_2$ | CaO | $Nb_2O_5$ | | | | | |
| 1 | 51.86 | 36.08 | 11.64 | 0.42 | 100 | 1000 | 250 | 6 | 80 | 330 | 342 | 425 |
| 2 | 51.86 | 36.08 | 11.64 | 0.42 | 100 | 1000 | 250 | 8 | 60 | 314 | 335 | 419 |
| 3 | 51.86 | 36.08 | 11.64 | 0.42 | 100 | 1000 | 250 | 10 | 70 | 334 | 359 | 414 |
| 4 | 51.86 | 36.08 | 11.64 | 0.42 | 100 | 1000 | 250 | 11 | 60 | 316 | 333 | 417 |
| 5 | 51.86 | 36.08 | 11.64 | 0.42 | 100 | 1000 | 250 | 14 | 70 | 353 | 369 | 467 |
| 6 | 51.86 | 36.08 | 11.64 | 0.42 | 100 | 1000 | 250 | 18 | 60 | 356 | 370 | 458 |
| 7 | 51.45 | 36.43 | 11.67 | 0.45 | 100 | 1000 | 250 | 12 | 50 | 260 | 281 | 352 |
| 8 | 52.80 | 35.12 | 11.69 | 0.39 | 100 | 1000 | 250 | 6 | 90 | 316 | 358 | 354 |
| 9 | 51.86 | 36.08 | 11.64 | 0.42 | 150 | 1000 | 250 | 10 | 70 | 341 | 370 | 42.5 |
| 10 | 51.86 | 36.08 | 11.64 | 0.42 | 300 | 1000 | 250 | 10 | 70 | 348 | 375 | 432 |
| 11 | 51.86 | 36.08 | 11.64 | 0.42 | 400 | 1000 | 250 | 10 | 70 | 355 | 384 | 449 |
| 12 | 51.86 | 36.08 | 11.64 | 0.42 | 100 | 500 | 250 | 10 | 70 | 351 | 372 | 471 |
| 13 | 51.86 | 36.08 | 11.64 | 0.42 | 100 | 1500 | 250 | 10 | 60 | 357 | 387 | 485 |
| 14 | 51.86 | 36.08 | 11.64 | 0.42 | 100 | 1000 | 100 | 10 | 70 | 346 | 381 | 457 |
| 15 | 51.86 | 36.08 | 11.64 | 0.42 | 100 | 1000 | 300 | 10 | 70 | 347 | 385 | 461 |
| 16 | 51.86 | 36.08 | 11.64 | 0.42 | 100 | 1000 | 250 | 0 | 60 | 341 | 360 | 442 |
| 17 | 51.86 | 36.08 | 11.64 | 0.42 | 100 | 1000 | 250 | 2 | 60 | 323 | 345 | 414 |
| 18 | 51.86 | 36.08 | 11.64 | 0.42 | 100 | 1000 | 250 | 25 | 60 | 398 | 419 | 496 |
| 19 | 51.86 | 36.08 | 11.64 | 0.42 | 100 | 1000 | 250 | 43 | 60 | 581 | 601 | 685 |
| 20 | 51.86 | 36.08 | 11.64 | 0.42 | 100 | 1000 | 250 | 55 | 40 | 677 | 677 | 827 |
| 21 | 51.86 | 36.08 | 11.64 | 0.42 | 100 | 1000 | 250 | 60 | 40 | 693 | 693 | 840 |
| 22 | 50.00 | 37.48 | 12.08 | 0.44 | 100 | 1000 | 250 | 8 | 70 | 382 | 400 | 483 |
| 23 | 61.00 | 30.98 | 7.91 | 0.11 | 100 | 1000 | 250 | 11 | 30 | 365 | 352 | 463 |
| 24 | 57.47 | 37.04 | 5.00 | 0.49 | 100 | 1000 | 250 | 9 | 60 | 501 | 522 | 590 |
| 25 | 51.13 | 32.46 | 16.00 | 0.41 | 100 | 1000 | 250 | 10 | 90 | 428 | 469 | 476 |
| 26 | 52.12 | 36.16 | 11.72 | 0.00 | 100 | 1000 | 250 | 13 | 100 | 400 | 471 | 456 |
| 27 | 51.55 | 35.93 | 11.52 | 1.00 | 100 | 1000 | 250 | 12 | 50 | 381 | 409 | 480 |
| 28 | 51.86 | 36.08 | 11.64 | 0.42 | 20 | 1000 | 250 | 6 | 60 | 432 | 452 | 535 |
| 20 | 51.86 | 36.08 | 11.64 | 0.42 | 800 | 1000 | 250 | 8 | 60 | 471 | 489 | 571 |
| 30 | 51.86 | 36.08 | 11.64 | 0.42 | 100 | 50 | 250 | 13 | 70 | 517 | 538 | 615 |
| 31 | 51.86 | 36.08 | 11.64 | 0.42 | 100 | 3000 | 250 | 5 | 80 | 498 | 529 | 579 |
| 32 | 51.86 | 36.08 | 11.64 | 0.42 | 100 | 1000 | 10 | 10 | 70 | 421 | 440 | 520 |
| 33 | 51.86 | 36.08 | 11.64 | 0.42 | 100 | 1000 | 700 | 12 | 60 | 403 | 424 | 498 |
| 34 | 51.86 | 36.08 | 11.64 | 0.42 | 0 | 1000 | 250 | 10 | 50 | 439 | 442 | 621 |
| 35 | 51.86 | 36.08 | 11.64 | 0.42 | 600 | 1000 | 250 | 10 | 50 | 376 | 379 | 531 |
| 36 | 51.86 | 36.08 | 11.64 | 0.42 | 100 | 0 | 250 | 10 | 0 | 675 | 830 | 1856 |
| 37 | 51.86 | 36.08 | 11.64 | 0.42 | 100 | 3000 | 250 | 10 | 50 | 497 | 498 | 708 |
| 38 | 51.86 | 36.08 | 11.64 | 0.42 | 100 | 1000 | 0 | 10 | 50 | 468 | 475 | 699 |
| 39 | 51.86 | 36.08 | 11.64 | 0.42 | 100 | 1000 | 600 | 10 | 30 | 533 | 536 | 759 |

| | Magnetic property 500 kHz-50 mT | | | | Crystal property | | |
|---|---|---|---|---|---|---|---|
| No. | Magnetic-loss-minimum temp. (° C.) | Lowest magnetization loss value (kW/m³) | Magnetic loss value at 40° C. (kW/m³) | Magnetic loss value at 120° C. (kW/m³) | Average grain size (μm) | Percentage of grain size 6-10 μm (%) | Remarks |
| 1 | 60 | 191 | 195 | 250 | 7.7 | 52 | Example |
| 2 | 60 | 178 | 182 | 248 | 8.4 | 54 | Example |
| 3 | 50 | 186 | 186 | 237 | 7.3 | 56 | Example |
| 4 | 60 | 166 | 170 | 229 | 7.0 | 56 | Example |
| 5 | 50 | 167 | 167 | 232 | 7.1 | 54 | Example |
| 6 | 50 | 158 | 160 | 210 | 6.6 | 52 | Example |
| 7 | 50 | 150 | 162 | 199 | 7.1 | 57 | Example |
| 8 | 60 | 194 | 195 | 257 | 8.0 | 52 | Example |
| 9 | 50 | 189 | 191 | 242 | 7.3 | 55 | Example |
| 10 | 50 | 191 | 195 | 257 | 7.5 | 53 | Example |
| 11 | 50 | 196 | 198 | 266 | 7.5 | 52 | Example |
| 12 | 50 | 188 | 189 | 255 | 7.3 | 55 | Example |
| 13 | 40 | 198 | 198 | 294 | 7.2 | 57 | Example |
| 14 | 50 | 188 | 192 | 253 | 7.3 | 54 | Example |
| 15 | 50 | 189 | 195 | 259 | 7.2 | 56 | Example |
| 16 | 60 | 276 | 278 | 338 | 9.3 | 50 | Comparative example |
| 17 | 60 | 201 | 208 | 280 | 9.2 | 50 | Comparative example |
| 18 | 60 | 159 | 163 | 219 | 6.1 | 49 | Comparative example |
| 19 | 60 | 251 | 252 | 320 | 8.2 | 47 | Comparative example |
| 20 | 80 | 309 | 311 | 377 | 9.1 | 45 | Comparative example |

TABLE 1-continued

| | | | | | | | |
|---|---|---|---|---|---|---|---|
| 21 | 80 | 381 | 385 | 429 | 9.3 | 41 | Comparative example |
| 22 | 70 | 273 | 277 | 325 | — | — | Comparative example |
| 23 | 30 | 301 | 299 | 398 | — | — | Comparative example |
| 24 | 60 | 316 | 318 | 372 | — | — | Comparative example |
| 25 | 90 | 247 | 217 | 296 | — | — | Comparative example |
| 26 | 100 | 211 | 238 | 264 | — | — | Comparative example |
| 27 | 50 | 203 | 204 | 282 | — | — | Comparative example |
| 28 | 60 | 222 | 224 | 281 | — | — | Comparative example |
| 20 | 60 | 236 | 238 | 292 | — | — | Comparative example |
| 30 | 50 | 388 | 390 | 459 | — | — | Comparative example |
| 31 | 60 | 362 | 364 | 420 | — | — | Comparative example |
| 32 | 50 | 238 | 240 | 299 | — | — | Comparative example |
| 33 | 60 | 204 | 206 | 273 | — | — | Comparative example |
| 34 | 50 | 213 | 214 | 378 | — | — | Comparative example |
| 35 | 50 | 156 | 160 | 244 | — | — | Comparative example |
| 36 | 0 | 532 | 801 | 1906 | — | — | Comparative example |
| 37 | 20 | 273 | 276 | 512 | — | — | Comparative example |
| 38 | 40 | 270 | 270 | 483 | — | — | Comparative example |
| 39 | 40 | 233 | 234 | 406 | — | — | Comparative example |

Note:
"—" means not measured.

Example 2

Granulated powder produced by the same method as in Example 1 using the compositions of basic components and auxiliary components listed in Table 2 was formed into a ring shape as in Example 1 to make a formed ring. The continuous firing furnace was then adjusted so that the firing conditions were the same as in Example 1, and the formed ring was fired. Multiple formed rings of the same composition were also fired on different days (multiple days) under the same firing conditions using the same continuous firing furnace. The magnetic loss (iron loss) of these fired products with different firing dates (specifically, magnetic loss (iron loss) under the conditions of frequency: 100 kHz, highest magnetic flux density: 200 mT, temperature: 80° C., and magnetic loss (iron loss) under the conditions of frequency: 500 kHz, highest magnetic flux density: 50 mT, and temperature: 80° C.) were measured by the method described above, and the mean and standard deviation were determined. The results are listed in Table 2.

TABLE 2

| | Chemical composition | | | | | | | | Magnetic loss value | | | | |
|---|---|---|---|---|---|---|---|---|---|---|---|---|---|
| | Basic component (mol %) | | | | Auxiliary component (mass ppm) | | | | 100 kHz, 200 mT, 80° C. | | 500 kHz, 50 mT, 80° C. | | |
| No. | $Fe_2O_3$ | MnO | ZnO | CoO | $SiO_2$ | CaO | $Nb_2O_5$ | K (*content of sintered body) | Mean ($kW/m^3$) | Standard deviation ($kW/m^3$) | Mean ($kW/m^3$) | Standard deviation ($kW/m^3$) | Remarks |
| 1 | 51.86 | 36.08 | 11.64 | 0.42 | 100 | 1000 | 250 | 7 | 335 | 7.9 | 221 | 5.9 | Example |
| 2 | 51.86 | 36.08 | 11.64 | 0.42 | 100 | 1000 | 250 | 12 | 341 | 5.7 | 181 | 4.8 | Example |
| 3 | 51.86 | 36.08 | 11.64 | 0.42 | 100 | 1000 | 250 | 1 | 392 | 10.1 | 252 | 9.5 | Comparative example |

In general, it was recognized that the use of the continuous firing furnace tends to increase the variation of magnetic loss and other parameters, but as seen in Table 2, it was confirmed that the variation of magnetic loss values is reduced by following the present disclosure.

The invention claimed is:

1. MnZnCo-based ferrite consisting of basic components, auxiliary components, and inevitable impurities, wherein the basic components are $Fe_2O_3$: 51.00 mol % or more and less than 58.00 mol %, ZnO: 6.00 mol % or more and less than 13.00 mol %, and CoO: more than 0.10 mol % and 0.50 mol % or less, with the balance being MnO, and the auxiliary components are 50 mass ppm to 500 mass ppm of Si in terms of $SiO_2$, 200 mass ppm to 2000 mass ppm of Ca in terms of CaO, 85 mass ppm to 500 mass ppm of Nb in terms of $Nb_2O_5$, and 5 mass ppm to 18 mass ppm of K, relative to the basic components, wherein a lowest magnetic loss value is 200 $kW/m^3$ or less when measured with a highest magnetic flux density being 50 mT and at a frequency of 500 kHz.

2. MnZnCo-based ferrite consisting of basic components, auxiliary components, and inevitable impurities, wherein the basic components are $Fe_2O_3$: 51.00 mol % or more and less than 58.00 mol %, ZnO: 6.00 mol % or more and less than 13.00 mol %, and CoO: more than 0.10 mol % and 0.50 mol % or less, with the balance being MnO, and the auxiliary components are 50 mass ppm to 500 mass ppm of Si in terms of $SiO_2$, 200 mass ppm to 2000 mass ppm of Ca in terms of CaO, 85 mass ppm to 500 mass ppm of Nb in terms of $Nb_2O_5$, and 5 mass ppm to 18 mass ppm of K, relative to the basic components, wherein an average grain size is 6.5 μm or more and 9.0 μm or less, a percentage of crystal grains having a grain size of 6 μm to 10 μm is 51% or more, a lowest magnetic loss value is 360 $kW/m^3$ or less when measured with a highest magnetic flux density being 200 mT and at a frequency of 100 kHz, and a lowest magnetic loss value is 200 $kW/m^3$ or less when measured with a highest magnetic flux density being 50 mT and at a frequency of 500 kHz.

* * * * *